United States Patent
Stoffberg

[11] Patent Number: 6,069,692
[45] Date of Patent: May 30, 2000

[54] UPGRADING A MISSILE LAUNCHER SYSTEM

[75] Inventor: Pieter Andries Stoffberg, Pretoria, South Africa

[73] Assignee: IST Dynamics (Proprietary) Limited, Pretoria, South Africa

[21] Appl. No.: 09/062,802

[22] Filed: Apr. 20, 1998

[30] Foreign Application Priority Data

Apr. 21, 1997 [ZA] South Africa ............................ 97/3407

[51] Int. Cl.[7] .................................................. G01B 11/26
[52] U.S. Cl. ...................... 356/152.1; 89/41.05; 244/3.11
[58] Field of Search ......................... 244/3.11; 356/152.1; 89/41.05

[56] References Cited

U.S. PATENT DOCUMENTS

| | | |
|---|---|---|
| 3,742,812 | 7/1973 | Woodworth et al. . |
| 4,155,096 | 5/1979 | Thomas et al. . |
| 4,386,848 | 6/1983 | Glendenin et al. . |
| 4,422,758 | 12/1983 | Godfrey et al. . |
| 4,922,801 | 5/1990 | Jaquard et al. ......................... 89/41.05 |
| 5,052,800 | 10/1991 | Mimmack et al. . |
| 5,077,609 | 12/1991 | Manelphe . |
| 5,197,691 | 3/1993 | Amon et al. ............................ 244/3.13 |

OTHER PUBLICATIONS

"Understanding Military Technology", Hamlyn Publishing Group UK (1985).
"Digital Processing of Aerial Images", SPIE vol. 186 pp. 73–87 (1979).

Primary Examiner—Stephen C. Buczinski
Attorney, Agent, or Firm—Killworth, Gottman, Hagan & Schaeff LLP

[57] ABSTRACT

A missile launcher system includes a launching tube and a tracker for tracking a target and for adjusting a flight path of the missile while in flight such that it will hit the target. The tracker includes an optical channel (12) having an optical aiming marking (e.g. cross hairs) and control means to adjust the missile flight path in response to aiming of the optical aiming marking. The invention provides for conversion of the missile launcher system by projecting the optical aiming marking via a video camera (16) conveniently by means of a retro reflector (18) on a monitor, generating and adjusting an electronic aiming marking to coincide with the optical aiming marking and connecting the video camera to the optical channel. Remote controlling the video camera to aim at the target in accordance with images on the monitor thus aims the optical channel appropriately and thus causes the control means to control the missile appropriately to hit the target.

6 Claims, 1 Drawing Sheet

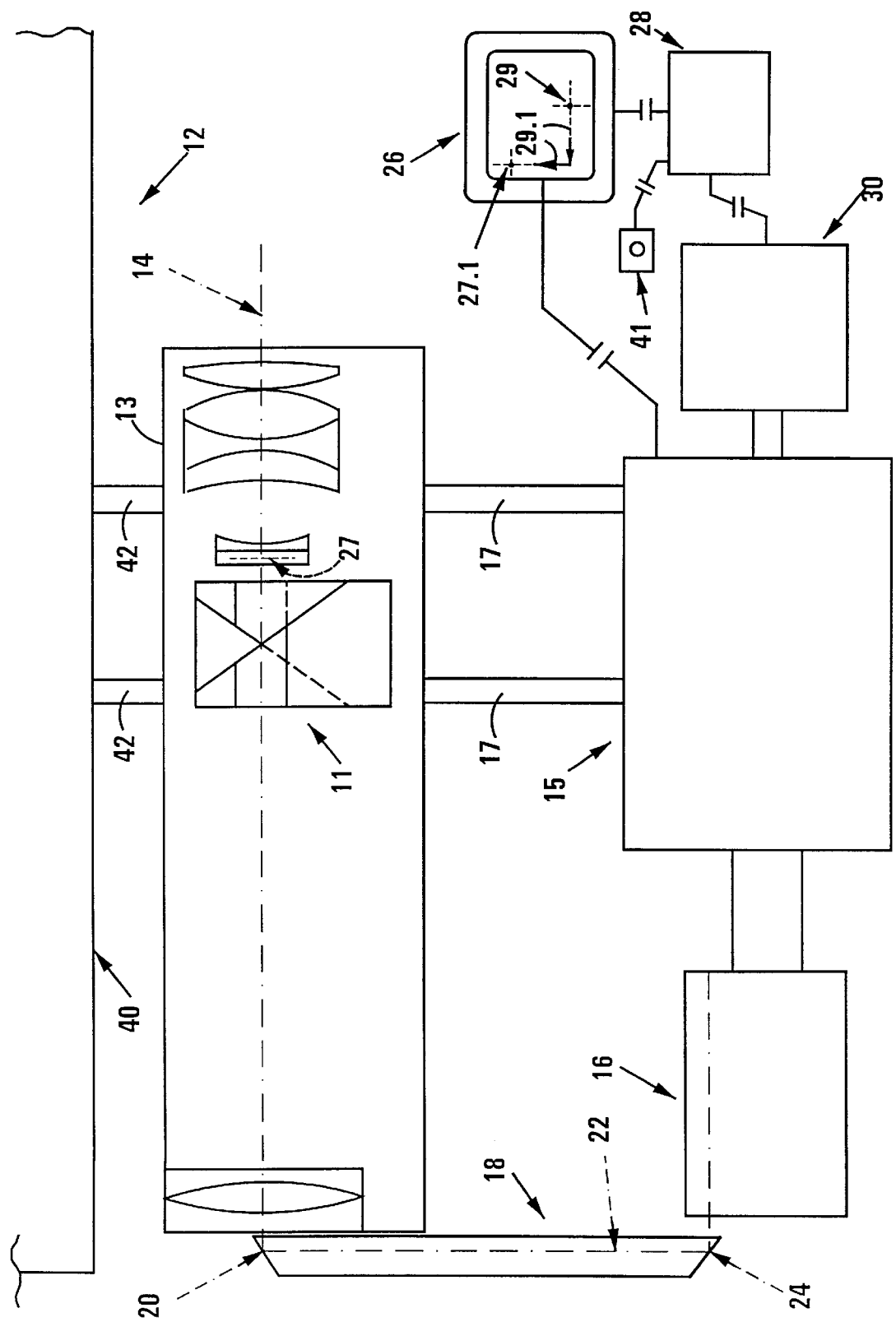

UPGRADING A MISSILE LAUNCHER SYSTEM

BACKGROUND OF THE INVENTION

THIS INVENTION relates to operating a missile launcher system. It relates more specifically to a method of upgrading a missile launcher system to enable it to be remotely controlled, and to an upgrading kit for a missile launcher system.

SUMMARY OF THE INVENTION

A missile launcher system, of the kind to which this invention generally relates, includes a launching tube for holding a missile ready for being launched, and a tracker for tracking a target while the missile is in flight and for adjusting the flight path of the missile such as to hit the target. The tracker includes an optical channel having an optical aiming marking such as cross hairs, and control means using, for example, goniometry, connected to the optical channel. The optical channel is aimed at the target and the flight path of the missile is sensed, compared with a sight line to the target as established by the optical channel, and the missile is controlled to follow a flight path to hit the target.

In accordance with this invention, there is provided a method of upgrading a missile launcher system which generally includes a launching tube for holding a missile ready for being launched, and a tracker for tracking a target while the missile is in flight and for adjusting the flight path of the missile such as to hit the target, the tracker including an optical channel having an optical aiming marking, and control means connected to the optical channel and adapted to adjust the flight path of the missile to coincide with a sight path through the optical channel through the aiming marking, to enable the missile launcher system to be remotely controlled using a video camera and video monitor, the method including rigidly mounting a video camera in fixed relation to the optical channel and aligned generally parallel with the optical channel;

projecting the optical aiming marking of the optical channel on the monitor via the video camera;

generating electrically an electronic aiming marking on the monitor;

electronically adjusting the electronic aiming marking to coincide with the image of the optical aiming marking on the monitor to compensate for any mis-alignment between the optical channel and the video camera;

providing remotely controlled following apparatus for the optical channel to adjust it remotely to follow the target in response to images on the monitor.

Projecting the aiming marking of the optical channel on the monitor via the video camera may be effected by projecting light beams through the optical channel and reflecting said light beams by means of a retro-reflector orthogonally rearwardly with a predetermined offset into a lens system of the video camera, the offset being preselected to coincide with a transverse spacing between the optical channel and the video camera. Projecting the light beams may include directing artificial light through the optical channel, e.g. by means of an electric torch.

Thus, if an operator directs the electronic aiming marking onto a target image projected on the monitor, the aiming marking of the optical channel will be directed on the actual target.

Further in accordance with the invention, there is provided an upgrading kit suitable for use in converting a missile launcher system which generally includes a launching tube for holding a missile ready for being launched, and a tracker for tracking a target while the missile is in flight and for adjusting the flight path of the missile such as to hit the target, the tracker including an optical channel having an optical aiming marking, and control means connected to the optical channel and adapted to adjust the flight path of the missile to coincide with a sight path through the optical channel through the aiming marking, to a remotely controlled missile launcher system, the upgrading kit comprising a video camera and monitor;

mounting means for mounting the video camera in fixed relation to and generally parallel to the optical channel of the tracker of the missile launcher system;

projecting means for projecting the optical aiming marking of the optical channel via the video camera on the monitor;

adjusting means for generating an electronic aiming marking and for adjusting it to coincide with the image of the optical aiming marking on the monitor, such that, when the electronic aiming marking is aimed on a visual image of a target projected by the camera on the monitor, the optical aiming marking will be aimed on the actual target; and remotely controlled following apparatus, operable in response to images on the monitor, to adjust the orientation of the optical channel to aim it at the target.

Thus, in effect, the optical channel is aimed at the target by using the video camera and monitor, thus causing the conventional control apparatus of the missile launcher system to control flight of the missile conventionally.

The projecting means may include a retro-reflector having mounting means for mounting it in relation to the optical channel to reflect light beams beaming in use through the optical channel orthogonally rearwardly with a predetermined offset into a lens system of the video camera, the offset being preselected to coincide with a transverse spacing between the optical channel and the video camera. The projecting means may include a source of artificial light (e.g. an electric torch) for projecting light beams through the optical channel to enhance projection of the image of the optical aiming marking.

BRIEF DESCRIPTION OF THE DRAWING

The invention is now described by way of example with reference to the accompanying diagrammatic drawing which shows, schematically, electronic aligning of a video camera with an optical channel of a missile launcher system.

DETAILED DESCRIPTION OF THE INVENTION

Generally, the invention provides for upgrading a missile launcher system of the general kind described to a remotely controlled missile launcher system using a video camera 15 and a monitor 26. Broadly, in a preferred method or embodiment, a support (e.g. a tripod) is provided to render a launcher tube(s) 40 and tracker free standing. The launcher tube(s) and tracker can be swivelled into a desired arc of fire. The launcher tube 40 and tracker can be remotely adjusted in respect of line and elevation via a mounting head to follow the target. The video camera 15 is aligned in accordance with the invention with an optical channel 12 having a housing 13 such that aiming by means of an electronic aiming market on an image of the target on the monitor 26 is equivalent to aiming the optical channel 12 at the target.

With reference to the Figure the missile launcher system includes the launcher tube 40 and the optical channel, which is schematically indicated by reference numeral 12. The optical channel includes a housing 13 and a lens system 11 having an axis 14 also representing a line of sight which, in conventional use, is aimed at a target, and which is used by a goniometer as a datum. The goniometer forms part of control apparatus, which is briefly mentioned below.

In accordance with the invention, a video camera 15 having a lens system 16 is used to project images of a target and surrounding features onto a monitor 26.

In accordance with the invention, the video camera 15 is mounted rigidly with or in fixed relation to the optical channel 12, and generally parallel therewith, as shown at 17. A retro-reflector 18 is used to reflect light beams beamed along the line of sight 14 orthogonally as indicated by reference numerals 20, 22, 24 into the lens system 16 at a predetermined offset corresponding to the transverse spacing between the lens system 16 and the optical channel 12.

Thus, a visual image of an aiming marking, for example cross-hairs, 27 corresponding with the line of sight 14 is projected via the video camera 15 on the monitor 26. An electronic aiming marking is generated, and is adjusted on the monitor 26 to coincide with the position of the optical aiming marking image 27.1. Thus, if the video camera 15, and more specifically the 29 is in use aligned with an image of a target on the monitor 26, the line of sight 14 of the optical channel 12 will aim at the actual target because the video camera 15 and the optical channel 12 move in unison. Thus, effectively, the optical channel 12 is adjusted via processing software, schematically indicated at 28, and by using means of adjusting motors schematically indicated at 30, by using images on the monitor 26 as duscribed above to adjust the attitude of the video camera 15 and the optical channel 12 ti aim at the target. Furthermore, the conventional control system of the missile launcher system is arranged, in response to aiming of the optical channel 12, to control flight of the missile to ensure that it follows the sight path to the target and thus that it hits the target.

It is a general advantage of the invention that a missile launcher system in accordance with the invention can be operated from a remote position which can be under cover, thus greatly enhancing safety of an operator.

Furthermore, as described above, very important electronic and computerized sub-systems of conventional design and construction can be used to enhance aiming onto the target and to enhance adjustment in the attitude of the optical channel 12 to follow the target.

What is claimed is:

1. A method of upgrading a missile launcher system which generally includes a launching tube for holding a missile ready for being launched, and a tracker for tracking a target while the missile is in flight and for adjusting the flight path of the missile such as to hit the target, the tracker including an optical channel having an optical aiming marking, and control means connected to the optical channel and adapted to adjust the flight path of the missile to coincide with a sight path through the optical channel through the aiming marking, to enable the missile launcher system to be remotely controlled using a video camera and video monitor, the method including rigidly mounting a video camera in fixed relation to the optical channel and aligned generally parallel with the optical channel;

projecting the optical aiming marking of the optical channel on a monitor via the video camera;

generating electrically an electronic aiming marking on the monitor;

electronically adjusting the electronic aiming marking to coincide with the image of the optical aiming marking on the monitor to compensate for any mis-alignment between the optical channel and the video camera;

providing remotely controlled following apparatus for the optical channel to adjust it remotely to follow the target in response to images on the monitor.

2. A method as claimed in claim 1 in which projecting the aiming marking of the optical channel on the monitor via the video camera is effected by projecting light beams through the optical channel and reflecting said light beams by means of a retro-reflector orthogonally rearwardly with a predetermined offset into a lens system of the video camera, the offset being preselected to coincide with a transverse spacing between the optical channel and the video camera.

3. A method as claimed in claim 2 in which projecting the light beams includes directing artificial light through the optical channel.

4. An upgrading, kit suitable for use in upgrading a missile launcher system which generally includes a launching tube for holding a missile ready for being launched, and a tracker for tracking a target while the missile is in flight and for adjusting the flight path of the missile such as to hit the target, the tracker including an optical channel having an optical aiming marking, and control means connected to the optical channel and adapted to adjust the flight path of the missile to coincide with a sight path through the optical channel through the aiming marking to a remotely controlled missile launcher system, the upgrading kit comprising a video camera and monitor;

mounting means for mounting the video camera in fixed relation to and generally parallel to the optical channel of the tracker of the missile launcher system;

projecting means for projecting the optical aiming marking of the optical channel via the video camera on the monitor;

adjusting means for generating an electronic aiming marking and for adjusting it to coincide with the image of the optical aiming marking on the monitor, such that, when the electronic aiming marking is aimed on a visual image of a target projected by the camera on the monitor, the optical aiming marking will be aimed on the actual target; and remotely controlled following apparatus, automatically operable in response to images on the monitor, to adjust the orientation of the optical channel to aim it at the target.

5. An upgrading kit as claimed in claim 4 in which the projecting means includes a retro-reflector having mounting means for mounting it in relation to the optical channel to reflect light beams beaming in use through the optical channel orthogonally rearwardly with a predetermined offset into a lens system of the video camera, the offset being preselected to coincide with a transverse spacing between the optical channel and the video camera.

6. An upgrading kit as claimed in claim 5 in which the projecting means includes a source of artificial light for projecting light beams through the optical channel to enhance projection of the image of the optical aiming marking.

* * * * *